Aug. 18, 1925.
M. H. KERN
1,550,440
AUTOMOBILE LIGHT DEFLECTOR
Filed Sept. 15, 1924  3 Sheets-Sheet 3
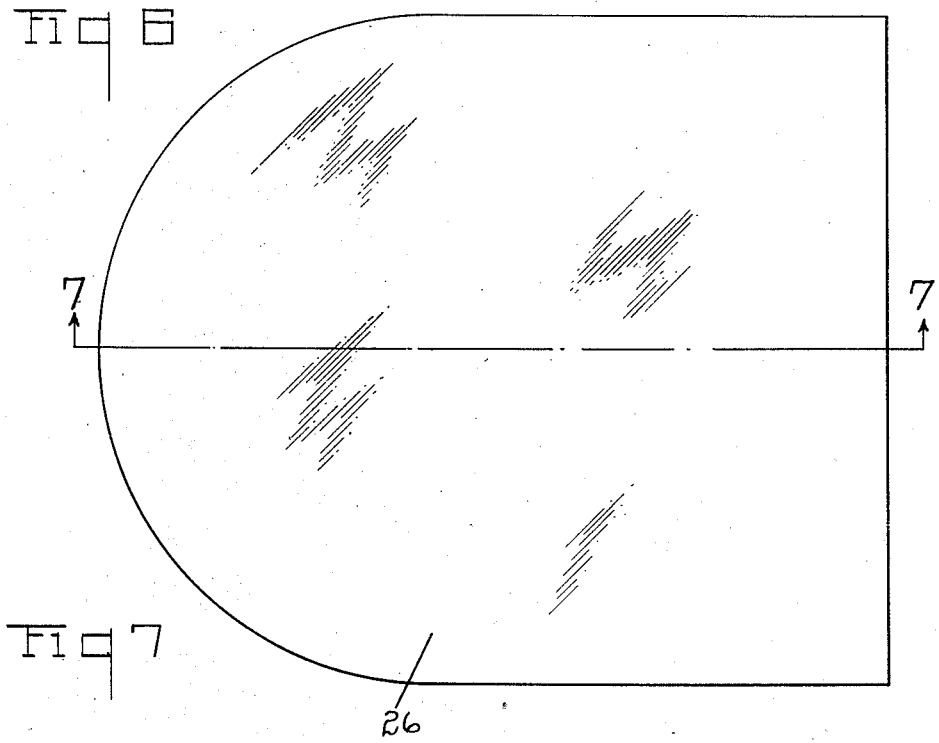
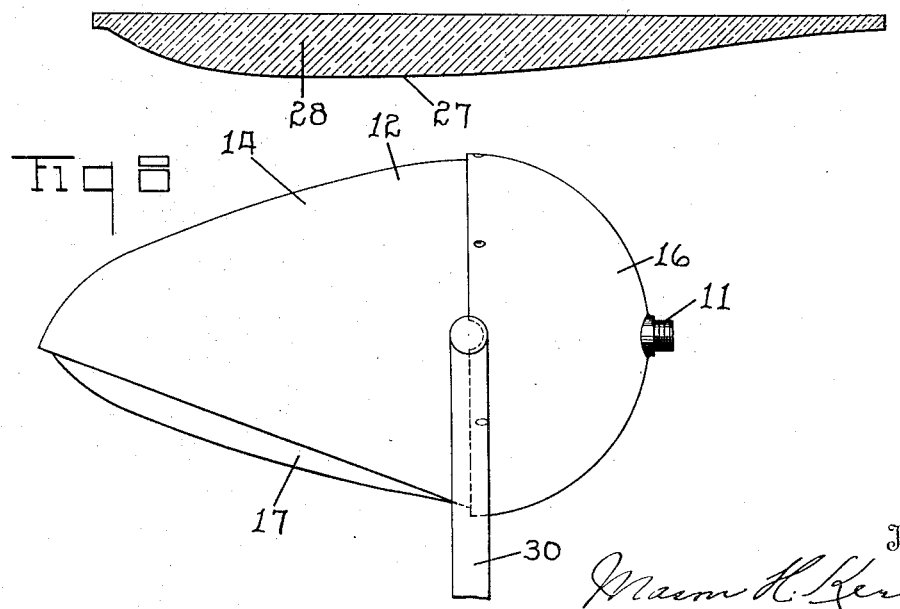

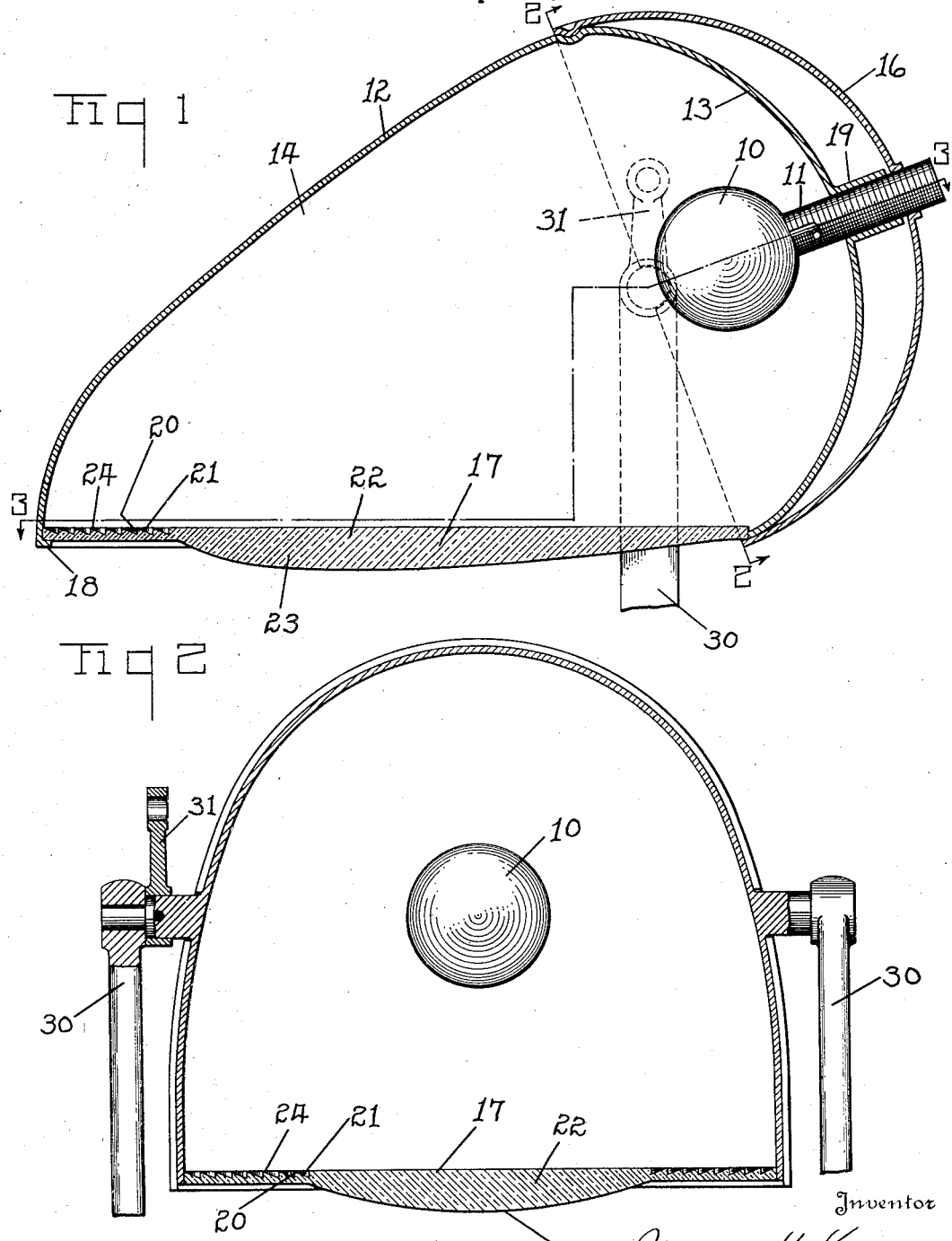

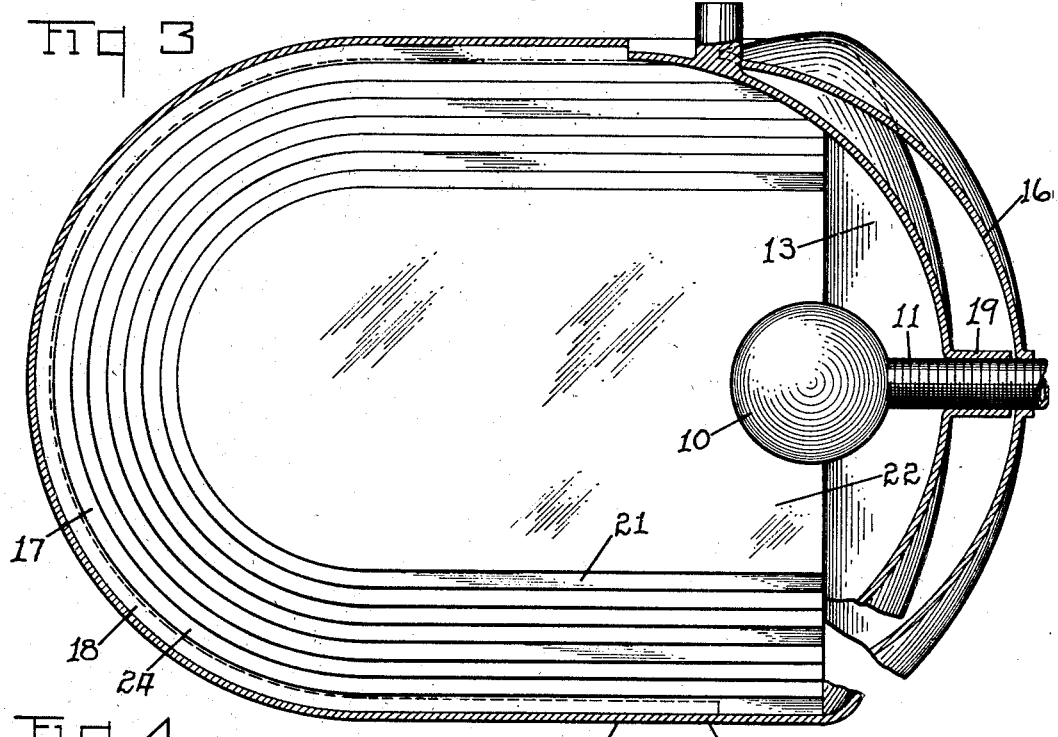
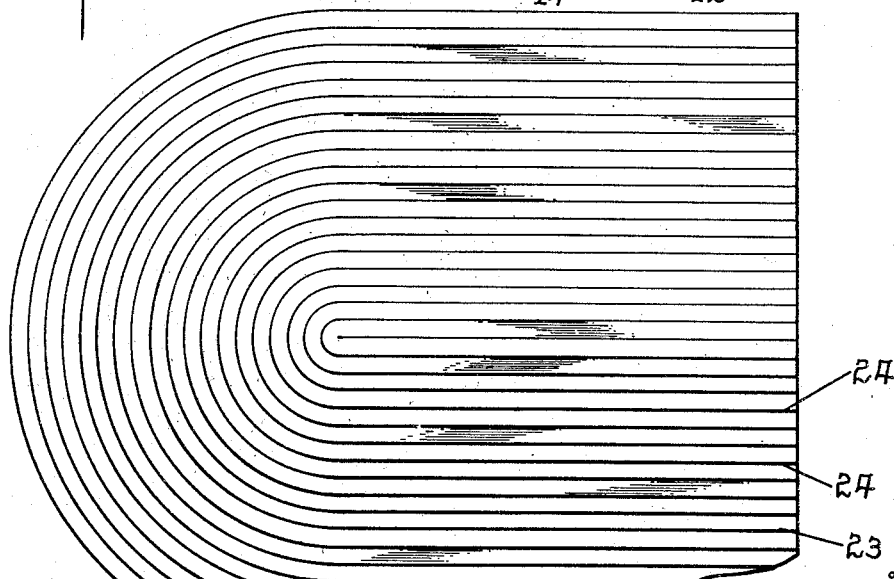
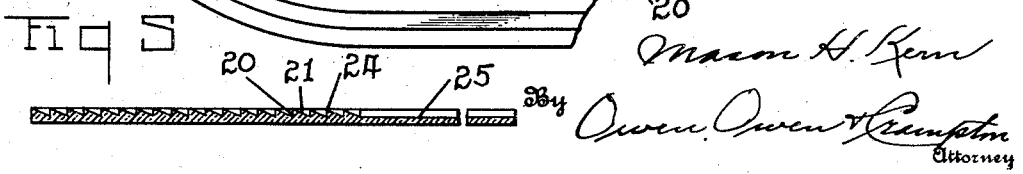

Patented Aug. 18, 1925.

1,550,440

UNITED STATES PATENT OFFICE.

MASON H. KERN, OF TOLEDO, OHIO.

AUTOMOBILE LIGHT DEFLECTOR.

Application filed September 15, 1924. Serial No. 737,674.

*To all whom it may concern:*

Be it known that I, MASON H. KERN, a citizen of the United States, and a resident of Toledo, in the county of Lucas and State of Ohio, have invented a new and useful Automobile Light Deflector, which invention is fully described in the following specification.

My invention has for its object to provide a light deflector wherein all of the light of the lamp is refractively directed to the road and no diffused light will be able to rise above a desired height. Thus the light may be used for lighting a road in front of an automobile without blinding the driver of an approaching machine. One portion of the lamp is so formed as to reflect the rays of light towards the forward edge of the deflector while the other portion of the reflector extends forward in the form of a visor to reflect all diffused rays in a direction towards the road, and a lens is located across the edges of the said portions. The lens is so constructed as to refract the rays so that they will be projected forward of the leading edge of the deflector as far as may be within certain limitations as to thickness of the lens. In the preferred form of the invention, the lens is provided with prismatic sections or ridges having inwardly extending vertical surfaces and sloping or inclined inner surfaces that meet the vertical surfaces on the side of the leading edge of the deflector. These inwardly extending ridges are preferably located on the inside of the deflector and extend circularly around the forward portion of the deflector and parallel to the side edges of the deflector, the central portion of the lens being plano-convex, the convex side being on the lower side of the lens. Also means may be provided for tilting the lamp at any desired angle relative to the horizontal to vary the light area produced on the roadway in advance of the automobile on which the lamp is mounted.

The invention may be contained in structures of different forms. To illustrate a practical application of the invention I have selected several examples of structures containing the invention and shall describe them hereinafter. The structures selected for purposes of illustration are shown in the accompanying drawings.

Figure 1 is a view of a vertical longitudinal section of a lamp embodying my invention. Figure 2 is a view of a section taken on the line 2—2 indicated in Fig. 1. Figure 3 is a sectional view taken on the line 3—3 indicated in Fig. 1. Figure 4 is a top view of a modified form of lens. Figure 5 illustrates a sectional view of another form of lens. Figure 6 is a top view of a third form of lens. Figure 7 is a sectional view taken on the line 7—7 indicated in Fig. 6. Figure 8 is a side view showing the position in which the lamp may be mounted for lighting the road in advance of the automobile.

In the form of invention shown in Fig. 1, the bulb 10 may be supported in an adjustable socket 11 that may be threaded into a suitable supporting part in order to adjust the bulb relative to the other parts of the lamp. The lamp is provided with a reflector 12. The reflector is divided into two portions. The portion 13 is concave and extends from above the lamp down behind and to a point beneath the lamp, as shown in Fig. 1. The projection of the upper part of the edge of this portion on the plane extending through its periphery is circular, while the projection of the lower edge on the same plane is a straight line. This is more clearly indicated in Fig. 2. The other portion 14 of the reflector 12 is visor-shaped and extends from the portion 13 to a point well to the front of the bulb 10, as best shown in Figs. 1 and 3. The projection of the lower edge of the reflector part 12 of the lamp on a plane extending through its edge is a circle in the forward part, and a straight line at the rear part. The circle is joined to the ends of the straight line by parallel lines. This is best shown in Fig. 3.

A suitable supporting or protective shell 16 may be located back of the portion 13 of the reflector. The lens 17 of the lamp extends across the edges of the portions 12 and 13 of the reflector. The lenses used are preferably circular along their forward edges, and their rear edges are straight, and the side edges extend parallel and join the rear edges with the circular forward edges. They are secured in position in the reflector by any suitable means, such as by the lip 18. The different concentrations of the light with reference to the reflector 12, particularly with reference to the portion 13, may be obtained by adjusting the position of the bulb 10 relative to the lens. In order to adjust the bulb a sleeve 19 may be formed integral with the central part of the portion 13 and the sleeve may be threaded to receive the threaded portion of the socket, and the position of the bulb 10 may be adjusted accordingly.

Lenses of different forms may be used to effectively project the light in advance of the forward edge of the reflector. In the form of construction shown in Fig. 1, the lens 17 is provided with a plurality of prismatic ridges 24 extending around the peripheral region thereof. The prismatic ridges are formed by surfaces 20 that extend vertically inward when the lens is located in a substantially horizontal plane and the surfaces 21 that are inclined upward to the plane of the lens to meet the vertical surfaces 20. The vertical surfaces 20 are located on the edge side of the lamp relative to the inclined surfaces 21. This causes the rays of light that strike this portion of the lens to spread outwards and forwards. The central portion 22 of the lens 17 may be plano-convex, the plane surface of the lens being located on the inside of the lamp, while the convex surface is located on the outside of the lamp. To direct the rays of light forward as much as possible, the thicker portion of the lens as at 23 is brought as far forward as possible, thus producing a curve that defines the lower side of the longitudinal section which is much sharper in the forward part of the lens than the curve extending from the point 23 to the rear end of the lens, as shown in Fig. 1.

If desired, the entire lens may be formed of the prismatic ridges having the vertical surfaces 20 and the inclined surfaces 21. That is, the ridges may be located throughout the upper or inner surface of the lens, as shown in Fig. 4. Also, if desired, the peripheral portion may be provided with the prismatic ridges 24 and the central portion may be made plane, as at 25, as shown in Fig. 5, or, if desired, the entire lens may be made plano-convex and similar in form to the central portion of the lens shown in Fig. 1. The plane side 26 of this form of lens is also located on the inside of the lamp, while the convex side 27 is located on the under or outer side. This is shown in Figs. 6 and 7. This brings the thicker portion of the lens, as at 28, somewhat nearer the forward edge of the lamp and is more effective in forwardly directing the light than the central portion of the lens of the form shown in Figs. 1, 2 and 3.

Suitable means is provided for tilting the light in order to obtain the desired angle of the rays of light, whereby the rays of light may be raised to any angle desired and thus the lighted area may be readily controlled. The lamp may be mounted on trunnions 30 and an arm 31 may be connected to the lamp for tilting the lamp. A suitable link leading to the dash or instrument board may be connected to the arm 31 for tilting the lamp at any desired angle.

Thus by my invention the rays of light that extend in advance of the lamp are refractively controlled. As is well known, a reflector may have an exceedingly well polished surface, yet the irregularities of the structure, which will appear under a magnifying glass, will cause diffusion of the rays of light and so that a large proportion of the light will not reflect according to the angle that it strikes the apparent plane of the surface of the reflector but will be spread in all directions by reason of the minute irregularities that occur even in the best of polished reflectors. By refractively controlling such rays, I am able to prevent all diffused light from rising above a certain point and yet, by reason of my enclosing bonnet-shaped reflector, I am enabled to utilize all of the light produced by the bulb and direct it in definite lines and eliminate the blinding effect commonly experienced in connection with night driving of automobiles.

I claim:—

1. In an automobile lamp, a bonnet-shaped reflector having a concave semi-circular light projecting portion and a forwardly extending portion for reflecting light downward, a light bulb having a source of light located in the axis of reflection of the upper half of the first named portion and near the plane of the margin of the said first named portion, and a lens extending across the edges of the said portions and having prismatic ridges formed by surfaces extending vertically when the lens is located in a horizontal plane and surfaces inclined upwards and away from the center of the lens and confined to the peripheral portion of the lens.

2. In an automobile lamp, a bonnet-shaped reflector having a concave semi-circular light projecting portion and a forwardly extending portion for reflecting light downward, a light bulb having a source of light located in the axis of reflection of the upper half of the first named portion and near the plane of the margin of the said first named portion, and a lens extending across the edges of the said portions and having a plano-convex portion for refracting the major portion of the light forward while the lens is in a horizontal position and having prismatic ridges located in the peripheral portion of the lens and formed by surfaces extending vertically when the lens is located in a horizontal plane and surfaces inclined away from the center of the lens.

In testimony whereof, I have hereunto signed my name to this specification.

MASON H. KERN.